US006414956B1

(12) United States Patent
Szczepanek

(10) Patent No.: US 6,414,956 B1
(45) Date of Patent: Jul. 2, 2002

(54) VLAN TAG TRANSPORT WITHIN A SWITCH

(75) Inventor: Andre Szczepanek, Hartwell (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/466,040

(22) Filed: Dec. 17, 1999

(51) Int. Cl.[7] .......................... H04J 12/56; H04J 15/00
(52) U.S. Cl. .................................. 370/392; 370/395.53
(58) Field of Search ................................ 370/230, 235, 370/241, 242, 244, 245, 250, 252, 389, 392, 395.1, 395.53, 401, 470, 471; 709/238, 236, 245

(56) References Cited

U.S. PATENT DOCUMENTS 6,128,666 A * 10/2000 Muller et al. ............... 370/401
6,157,647 A * 12/2000 Husak ......................... 370/392
6,181,699 B1 * 1/2001 Crinion et al. .............. 370/389
6,236,643 B1 * 5/2001 Kerstein .................... 370/254

FOREIGN PATENT DOCUMENTS

WO 99/00737 7/1999

OTHER PUBLICATIONS

"Virtual LANs Get Real", Staff of Data Communications, vol. 24, No. 3, 1995, pp. 87–92, 94, 96, New York.

* cited by examiner

Primary Examiner—Ricky Ngo
(74) Attorney, Agent, or Firm—Pedro P. Hernandez; W. James Brady III; Frederick J. Telecky, Jr.

(57) ABSTRACT

The present invention includes an improved switching device (400) which operates in a shared media environment. The switching device (400) in accordance with the present invention includes a tag header processing means (402) operable to insert a tag header into frames that enter the switching device (400) without a tag header and CRC processing means (404) operable to calculate a CRC for the frame excluding the tag header for use while the frame is being processed within the switching device (400). The tag header processing means (402) is further operable, when the internal switch processing of the frame is completed and the frame is ready to be transmitted, to determine whether or not the frame should be transmitted without a tag header and removing the tag header if it is not. The CRC processing means (404) is further operable to calculate a CRC for the frame when the internal processing of the frame is completed and, if the frame was originally received with a tag header, to corrupt the CRC if needed based on parity bits included in the tag header when the frame was received.

3 Claims, 2 Drawing Sheets

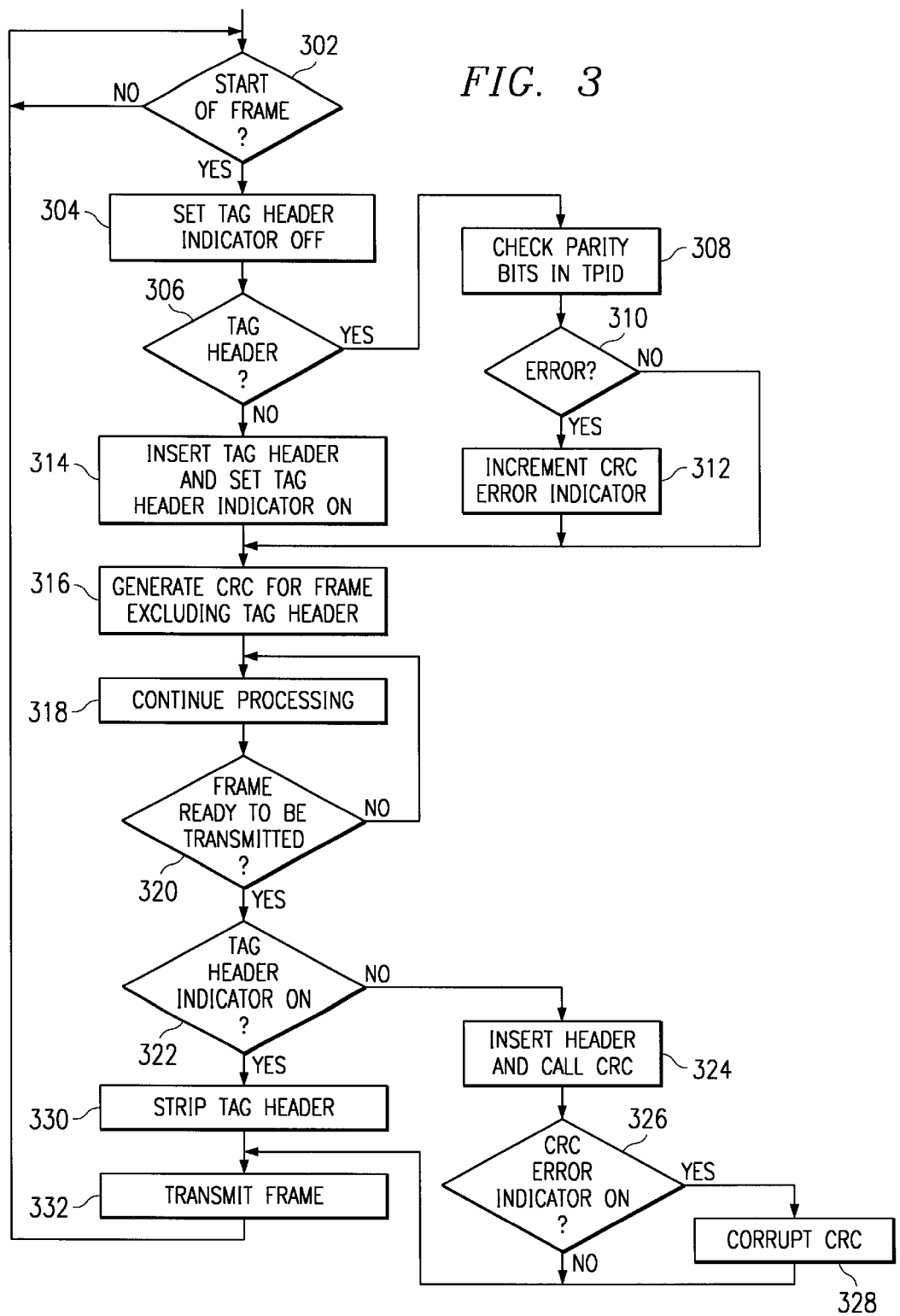

VLAN TAG TRANSPORT WITHIN A SWITCH

TECHNICAL FIELD OF THE INVENTION

This invention relates generally to data communications and more particularly to a method, system and apparatus for communicating data over shared media access.

BACKGROUND OF THE INVENTION

A networking protocol is a pre-defined format for transmitting information between two or more devices. Networking protocols define, for example, the type of data compression used, the type of error checking performed, mechanisms for signaling to other devices that a message has been sent and for signaling to other devices that a message has been received. Packet-switching is a technique in which messages are divided into portions, referred to as packets, before being transmitted to the intended destination. Networking protocols such as TCP/IP, X.25, and Frame Relay are all packet-switching based protocols. In a TCP/IP network, packets are often referred to as datagrams. Each packet may follow a different route to reach the intended destination in that the destination address is included in the packet. Once all the packets are received at the intended destination, they are recombined to form the original message.

A switch is a device that connects multiple LANs or LAN segments and filters, i.e., examining the packet to determine its destination, in accordance with the networking protocol and forwards packets between them. Ethernet is a popular networking protocol defined by IEEE 802.3x standards. In an Ethernet network, the packets of information are referred to as frames. The Ethernet frame may be tagged or untagged where a tagged Ethernet frame includes an IEEE 802.1Q tag header, discussed in more detail hereinbelow, and an untagged Ethernet frame does not.

A media access controller (MAC) protocol is used to provide the data link layer of the Ethernet LAN system. As shown in the exemplary tagged Ethernet frame in FIG. 1, the MAC protocol encapsulates a SDU (payload data) 122 by adding an 18 byte header (Protocol Control Information (PCI)) (110, 112, 114, 120) before the data 122 and appending a 4-byte (32-bit) Cyclic Redundancy Check (CRC) 124 after the data 122.

As shown if FIG. 1, the header consists of four parts. First, the header includes a 6-byte destination address 110, which specifies either a single recipient node (unicast mode), a group of recipient nodes (multicast mode), or the set of all recipient nodes (broadcast mode). The header also includes a 6-byte source address 112, which is set to the sender's globally unique node address. This may be used by the network layer protocol to identify the sender, but usually other mechanisms are used (e.g. arp). Its main function is to allow address learning which may be used to configure the filter tables in a bridge. The third part of the header is a 4-byte IEEE 802.1Q tag header 114 which, as shown in more detail in FIG. 2, includes a 2-byte TPID 116, with a value of 81-00 (hex), and a 2 bytes of TCI 118. The TPID 116 is essentially a new IEEE-type field. The fourth part of the header is a 2-byte type field 120, which provides a Service Access Point (SAP) to identify the type of protocol being carried (e.g. the values 0×0800 is used to identify the IP network protocol, other values are used to indicate other network layer protocols). In the case of IEEE 802.3 LLC, this may also be used to indicate the length of the data part 122.

The 32-bit CRC 124 added at the end of the frame provides error detection in the case where line errors (or transmission collisions in Ethernet) result in corruption of the MAC frame. Any frame with an invalid CRC 124 is discarded by the MAC receiver without further processing. The MAC protocol, however, generally does not provide any indication that a frame has been discarded due to an invalid CRC 124.

It is important to realize that nearly all serial communications systems transmit the least significant bit of each byte first at the physical layer. Ethernet supports broadcast, unicast, and multicast addresses. The appearance of a multicast address on the cable (in this case an IP multicast address, with group set to the bit pattern 0xxx xxxx xxxx xxxx xxxx xxxx) is therefore as shown below (bits transmitted from left to right):

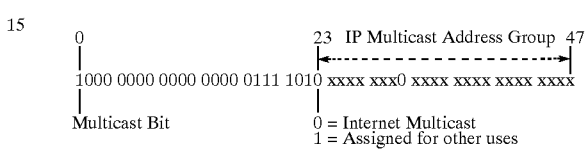

Note, however, that when the same frame is stored in the memory of a computer, the bits are ordered such that the least significant bit of each byte is stored in the right most position (bits transmitted right-to-left within octets, octets transmitted left-to-right):

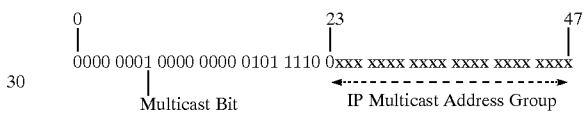

The Carrier Sense Multiple Access (CSMA) with Collision Detection (CD) protocol is used to control access to the shared Ethernet medium.

The Ethernet standard dictates a minimum size of frame, which requires at least 46 bytes of data to be present in every MAC frame. If the network layer wishes to send less than 46 bytes of data the MAC protocol adds sufficient number of zero bytes (0×00 also known as null padding characters) to satisfy this requirement. The maximum size of data which may be carried in a MAC frame using Ethernet is 1500 bytes (this is known as the MTU in IP).

A protocol known as the "Address Resolution Protocol" (arp) is used to identify the MAC source address of remote computers when IP is used over an Ethernet LAN.

A VLAN, or virtual LAN, as defined by the IEEE 802.1Q standard, is a network of devices configured through software rather than hardware that behave as if they are connected to the same wire even though they may actually be physically located on different segments of a LAN. In a VLAN, when a computer is physically moved to another location, it can stay on the same VLAN without any hardware reconfiguration. While VLANs were initially implemented by defining groupings of ports (i.e., ports 2, 5, and 6 comprise VLAN A while ports 1, 3, and 4 comprise VLAN B) on a single switch, VLANs that span multiple switches (i.e., ports 2, 5 and 6 on switch A and ports 1, 2 and 4 on switch B comprise VLAN A) are also contemplated.

SUMMARY OF THE INVENTION

In order to provide consistent treatment of signals within a switch in a shared media environment, the present invention provides for transporting all data frames within the switch with a VLAN tag and a Cyclic Redundancy Code (CRC) even when the signal is originally received without a VLAN tag.

In another aspect of the present invention, pre-defined fields internal to the switch are used to carry additional, private information within the switch as needed.

These and other features of the invention that will be apparent to those skilled in the art from the following detailed description of the invention, taken together with the accompanying drawings.

DESCRIPTION OF THE DRAWINGS

FIG. 3 is a flow diagram illustrating operation of a switching device in accordance with the present invention.

DETAILED DESCRIPTION OF THE INVENTION

Figure 4:
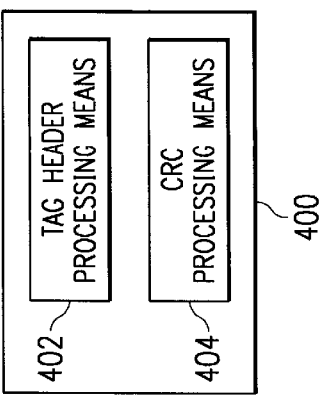
FIG. 4 shows a block diagram of a switching device which operates in accordance with the present invention.

In accordance with the present invention, while a frame exists within the switch it will always contain an IEEE 802.1Q header 114 in the 4 bytes following the source address. (If the frame is received without such information then it is inserted, during reception in the media access controller (MAC), from a register which contains the receiving port's default source port VLAN ID). If this information was a true representation of the IEEE 802.1Q header 114 then the first 2 of these 4 bytes would be a tag protocol identifier (TPID) field equal to the Ethernet-encoded IEEE 802.1 QTagType, which is a defined by the IEEE 802.1Q standard to be the constant 81.00 (hex). Since the value is a constant, and it's location within the frame is known, in accordance with another aspect of the present invention, these 16 bits of the frame are used to store other information while the frame exists within the switch. If the frame is eventually transmitted with the header included, as discussed in more detail hereinbelow, then the constant is inserted prior to transmission thereby replacing the 16 bits of information used while the frame was in the switch.

Figure 1:
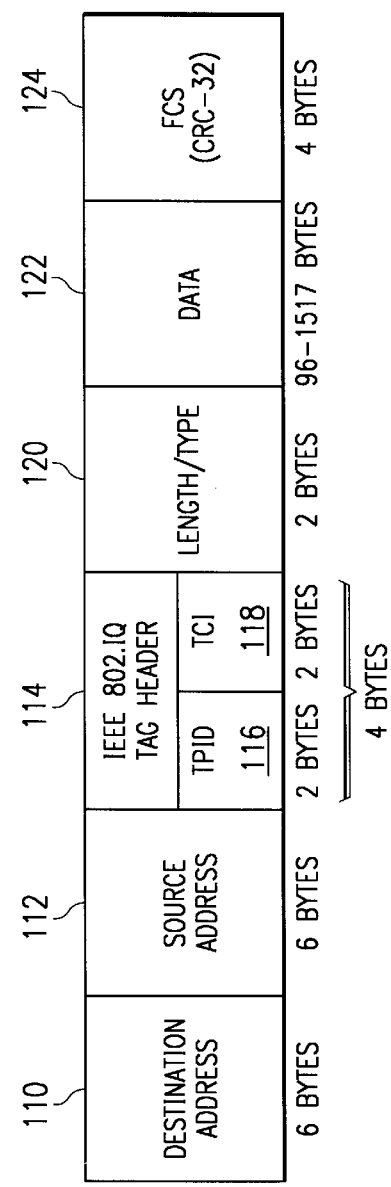
FIG. 1 shows the format of a prior art tagged Ethernet frame.
Figure 2:
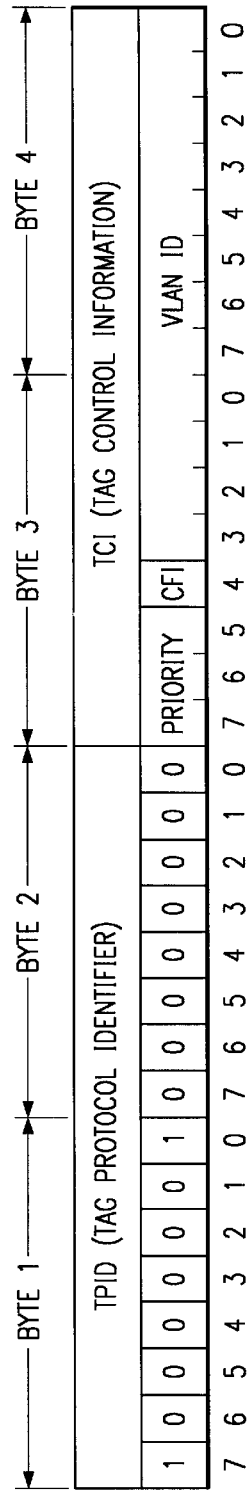
FIG. 2 illustrates in detail the IEEE 802.1Q tag header portion of the prior art tagged Ethernet frame shown in FIG. 1.

As shown in FIG. 1, the frame includes a 4 byte cyclic redundancy check (CRC) field 124. CRC errors occur when packets are somehow damaged in transit. When each packet is transmitted, the MAC layer of the transmitting device computes a frame check sequence (FCS) value based on the content of the packet. The receiving station performs the same calculation. If the FCS values differ, the packet is assumed to have been corrupted and is counted as a CRC error. CRC errors result from MAC layer hardware problem causing inaccurate computation of the FCS value or from other transmission problems that result in garbling of the original data.

In accordance with the present invention, the CRC bytes 124 within the received frame while it exists in the switch are used for the frame but is calculated excluding the 4 bytes immediately following the source address. A primary reason for this is that when the frame is transmitted it may be sent either with or without the IEEE 802.1Q header 114. A new CRC would then need to be generated for one or other of these cases. The CRC on frames must be checked as they are being transmitted and if the incoming frame included an error then the outgoing frame must include an error. If the CRC was generated on-the-fly for a frame excluding the header at transmit time then the frame s would be sent with a newly-generated perfect CRC while there was still 4 bytes of the frame left to check (since the CRC would in this case include the header). If an error is subsequently detected it is too late to ensure that the transmitted frame contained an error in that it will have gone out without an error 32 bit-times earlier. If however the internal format excludes the header, then the CRC is what is required to be sent with the frame if the tag is to be stripped. If this includes an error then the outgoing frame naturally acquires the error. If the CRC for a frame which includes the header is then generated at transmit time then the CRC can be completed in time to ensure that the outgoing frame includes a CRC error. For example, the final bit of the CRC can be inverted to deliberately introduce an error.

Since the header is not covered by the CRC in the internal format it is also easy to use the 16-bits of TPID field for other purposes without having to worry about the effect upon the CRC. The 16 bits where the TPID field should be are used as follows. The $1^{st}$ "TPID" byte is what would be the first byte of the Ethertype field on-the-wire. The $2^{nd}$ "TPID" byte is the one which follows. (As the byte address is incremented as each new byte is stored into memory the $1^{st}$ TPID byte is stored at one byte address larger than the final byte of source address, and the $2^{nd}$ TPID byte is stored at one byte address larger than that). The bit order is how the byte appears internally and on the external memory system. (This would be called native-Ethernet format if this information ever appeared on the wire, i.e., bit 0 of the sourceport would be the first bit on the wire). The 3 header-parity bits (MS bits in $2^{nd}$ TPID byte) are inserted during frame reception and checked during frame transmission. If a parity error is detected then the CRC error statistic is incremented and the outgoing frame must be deliberately corrupted to contain a CRC error.

While the frame is in the internal format in accordance with the present invention, a tag header indicator bit is set to a one when the frame is received if an IEEE 802.1Q header was inserted during reception. If no header was inserted (or a VLAN ID of 0×000 was replaced) then this bit must be set to zero. This bit ultimately determines the type of CRC that is provided in the frame if it is ever transmitted on the NM port. During transmission this entire field is replaced by constant 81.00 (hex).

FIG. 3 is a flow diagram illustrating generally operation of a switching device in accordance with the present invention. At decision block 302 if FIG. 3, if a start of frame indicator is detected, operation continues at block 304. Otherwise, operations continues with decision block 302 until a start of frame indicator appears. At block 304, the tag header indicator is set to zero or off. Operation then continues at decision block 306 where, if a tag header is detected within the current frame of data, then the parity bits in the TPID is checked at block 308. If, at decision block 310 the parity bits indicate that there is an error in the tag header, then operation continues at block 312 where the CRC error indicator is asserted. Otherwise, operation continues at block 316. Returning to decision block 306, if no tag header is detected, operation continues at block 314 where a tag header is inserted into the frame for use while the frame is internal to the switching device. Operation then continues at block 316.

At block 316, a CRC is generated for the frame. Generation of the CRC does not, however, include the tag header whether or not the tag header was inserted when the frame was received. At block 318, processing of the frame within the switch continues as required. Operation then continues at decision block 320 where, if the frame is ready to be transmitted, processing continues at decision block 322. At decision block 322, if the tag header indicator is asserted, meaning a tag header was added to the frame upon receipt by the switching device, then at block 330 the tag header is stripped from the frame and at block 332 the frame is transmitted. Otherwise, at decision block 322, if no tag header was inserted, i.e., the frame already included a tag header upon receipt by the switching device, then operation continues at block 324 where the TPID is inserted into the tag header (thus eliminating the data in the TPID used internally in the switch) and a new CRC is generated. This CRC is generated for the entire frame, including the tag header. Operation then continues at decision block 326 where, if the CRC error indicator is on (indicating that there was an error in the header when received by the switch), the newly generated CRC is corrupted. Operation then continues at block 332 where the frame is transmitted. Returning to decision block 326, if the CRC error indicator is not asserted, then operation again continues at block 332 where the frame is transmitted.

FIG. 4 illustrates an improved switching device 400 which operates in a shared media environment in accordance with the present invention. The switching device 400 includes tag header processing means 402 operable to insert a tag header into frames that enter the switching device 400 without a tag header and CRC processing means 404 operable to calculate a CRC for the frame excluding the tag header for use while the frame is being processed within the switching device 400. The tag header processing means 402 is further operable, when the internal switch processing of the frame is completed and the frame is ready to be transmitted, to determine whether or not the frame should be transmitted without a tag header and removing the tag header if it should not. The CRC processing means 404 is further operable to calculate a CRC for the frame when the internal processing of the frame is completed and, if the frame was originally received with a tag header, to corrupt the CRC if needed based on parity bits included in the tag header when the frame was received.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of processing a frame of data within a switching device in a shared media access environment comprising the steps of:

(a) if no tag header is included in the frame upon receipt, inserting a tag header in the frame to generate a first modified frame and asserting a tag header indicator;

(b) if a tag header is included in the frame upon receipt, using the received frame as the first modified frame and storing said tag header in a memory;

(c) generating a CRC for the first modified frame excluding said tag header to generate a second modified frame;

(d) processing the second modified frame within the switching device; and before transmitting the second modified frame:

(e) if said tag header indicator is asserted, removing said tag header from the second modified frame to generate a third modified frame;

(f) otherwise replacing the tag header in the second modified frame with said stored tag header to generate said third modified frame; and (g) generating a CRC for said third modified frame to generate a fourth modified frame;

(h) transmitting the fourth modified frame.

2. The method of claim 1 wherein step (b) includes the steps of checking parity bits within said tag header and asserting an error indicator if an error is detected; and wherein step (g) includes the step of corrupting said CRC for said fourth modified frame if said error indicator is asserted.

3. The method of claim 1 wherein step (d) includes the step of using a portion of said tag header to store additional information while said received frame is processed within the switching device.

* * * * *